United States Patent [19]

Takamiya

[11] 3,794,891

[45] Feb. 26, 1974

[54] HIGH SPEED RESPONSE PHOTOTRANSISTOR AND METHOD OF MAKING THE SAME

[75] Inventor: Saburo Takamiya, Itami, Japan

[73] Assignee: Mitsubishi Denki Kabushiki Kaisha, Tokyo, Japan

[22] Filed: Mar. 5, 1973

[21] Appl. No.: 338,252

[30] Foreign Application Priority Data

Mar. 3, 1972 Japan ............................. 47/22008

[52] U.S. Cl. ..... 317/235 R, 317/235 N, 317/234 B, 317/234 U, 317/235 Z, 250/211 J

[51] Int. Cl. ........................................ H01l 15/00

[58] Field of Search ........317/235 N, 234 Q, 234 U, 317/235 Z, 235 NA

[56] References Cited

UNITED STATES PATENTS

| | | | |
|---|---|---|---|
| 3,714,526 | 1/1973 | Low | 317/235 R |
| 3,697,832 | 10/1972 | Hanaoka | 317/235 R |
| 3,532,945 | 10/1970 | Weckler | 317/235 |
| 3,529,217 | 9/1970 | Van Santen | 317/235 |

*Primary Examiner*—Martin H. Edlow
*Attorney, Agent, or Firm*—Oblon, Fisher, Spivak, McClelland & Maier

[57] ABSTRACT

A high speed response phototransistor comprises a plurality of pairs of base layers and emitter layers formed with progressive diffusions on a common collector, and an emitter electrode which commonly connects the plurality of emitter layers. The width of a depletion layer between the base and emitter layers is broadened so that a narrow base-emitter layer whose area is significantly smaller than a planar spread of the depletion layer.

7 Claims, 11 Drawing Figures

(A)

PRIOR ART

PRIOR ART

HIGH SPEED RESPONSE PHOTOTRANSISTOR AND METHOD OF MAKING THE SAME

BACKGROUND OF THE INVENTION

1. Field of the Invention

This invention generally relates to a phototransistor and method of making the same and more particularly to a unique phototransistor which has a high speed response.

2. Description of the Prior Art

In the past, the response speed of known phototransistors has been up to about 1 $MH_z$ so that it was not suitable for use in microwave band applications. In order to explain the reason for low speed response in prior art phototransistors, the operational microwave transistor and phototransistor will now be illustrated with reference to FIGS. 1 and 2. FIG. 1 shows a sectional structure of a conventional transistor, and FIG. 2 shows equivalent circuit of the transistor of FIG. 1. In FIG. 1, a transistor T comprises a collector 1, a base 2, an emitter 3, insulation membrane 4, an emitter electrode 5, a base electrode 6, a collector electrode 7, an emitter terminal E, a base terminal B and a collector terminal C. A practical transistor has a range of layer thickness of, for example, several microns for an emitter, several microns for a base and several tens of microns for a collector. In FIG. 2, the references $\gamma e$, $\gamma b$, $\gamma c$ respectively designate series resistances of the emitter, base and collector, and $C_{EB}$ and $G_{EB}$ respectively designate capacitance and conductance between the emitter and base, $C_{BC}$ and $G_{BC}$ respectively designate capacitance and conductance between the base and collector; $V_{BE}$ designates a base input voltage; and $1_c$ designates a collector current.

In general, the response speed of a transistor is known to be limited by the following factors:

1. a transit time before the carriers injected from the emitter to the base region reach the collector;
2. a relation of susceptance to conductance between the emitter and base of ($jw\ C_{EB}\ |< G_{EB}$);
3. a relation of susceptance to conductance between the base and collector of ($jw\ C_{BC}\ |<G_{BC}$);
4. a relation of emitter series conductance $\gamma e^{-1}$ to susceptance between the emitter and base of ($jw\ C_{CB}\ |<\gamma e^{-1}$)
5. a relation of base series conductance $\gamma b^{-1}$ to susceptances between the emitter and base and between the base and collector of ($jw\ (C_{EB} + C_{BC})\ |\ >\gamma b^{-1}$); and
6. a relation of collector series conductance $\gamma c^{-1}$ to susceptance between the base and collector of ($jw\ C_{BC} <\gamma c^{-1}$)

Accordingly, in order to increase the response speed of the transistor of FIGS. 1 and 2, it is necessary to shorten the device time constants caused by the above factors. In order to shorten the time constant caused by the carriers of the collector 1 passing through the base region 2, it is necessary to minimize the thickness of the base region as well as to form a built-in field in the base. As usual, the built-in field is formed by providing an impurity concentration gradient in the base.

As the series resistance $\gamma b$ of the base region 2 is increased by decreasing the thickness of the base region, the limitation of factor 5 above becomes very pronounced. That is, it is necessary to decrease the capacitance $C_{EB}$ between the emitter and base and the capacitance $C_{BC}$ between the base and collector in order to provide a high speed response (angle frequency $\omega \rightarrow$ high), so that the area of the transistor must be decreased.

In the past, two methods for compensating for an increase of series resistance by decreasing the thickness of the base region have been considered. One method was to increase the impurity concentration of the base region and another was to decrease the spread resistance of the base region by decreasing the width of the emitter under a keeping area of the emitter. Since a current gain is decreased by the former method, the latter method has been usually applied in a microwave transistor.

FIG. 3 shows one embodiment of a structure of a conventional microwave transistor, wherein the width and space of the emitter are respectively between several microns and several tens of microns so that the spread resistance of the base region is small. In order to shorten the time-constant by the limitation of factor 2 listed above, it was necessary as a first means, to increase the bias-voltage between the emitter and base, or, as a second means, to shorten the lifetime of the carriers injected from the base region to the emitter region or the carriers injected from the emitter region to the base region, or, as a third means, to quickly pass the injected carriers to the emitter electrode and the collector region.

The lifetime of the carriers are determined by the type of semiconductor and type and concentration of impurity. A shortening of the lifetime causes a decrease in the current gain. Accordingly, the second means described above could not be applied.

The third means could be applied by decreasing a distance from the base emitter contact to the emitter electrode and by decreasing the thickness of the base region.

The time-constant caused by factor 4 could not be practically considered, because the emitter series resistance $\gamma_e$ is lower than the base series resistance $\gamma b$. The time-constant caused by factor 6 is substituted for the time-constant given by the relation of the susceptance between base-collector $jwC_{BC}$ to the collector load conductance $R_{LC}^{-1}$.

As stated above, in a microwave transistor the thickness of the base region is decreased and the width of the emitter region is decreased to compensate for the increase of the spread resistance. On the other hand, in a phototransistor, the input signal between the emitter and base is not electrical but rather optical. That is, the voltage between emitter-base is changed by the charge of carriers generated by the photoinput. Accordingly, the spread resistance of base is important since it causes a voltage drop (DC type) in the base region in a case of electrical operation and must be considered in determining a bias voltage between the emitter-base. However, it is unnecessary to consider the effect of factor 5 above to the carriers generated by the input photo signal, when the irradiation of light is uniformly distributed.

Moreover, in case of determination of bias voltage between the emitter and base, the base-terminal (base electrode) can be eliminated by optically providing a bias input. However, it is necessary to provide relatively high intensive light irradiation for a bias.

FIG. 4 shows one embodiment of a conventional phototransistor irradiating light from the vertical direction to a junction surface, wherein the reference $h\ \nu$ designates an incident angle of light and the other references are as defined above.

In the case of a phototransistor, the area of the photoinput electrode is decreased for effectively receiving light and the electrode is placed so as to increase the light receiving area. It is unnecessary to employ the base electrode of FIG. 4 when the determination of bias is optically derived. It has been known that the response speed of the phototransistor is determined depending upon the time-constant by the effects of factors 1–4 and 6; and the time-constant caused by the separation of the carriers generated by the input light to the base region and the collector region by the electric field between base-collector by the polarity of charge. The bias between the emitter and base could be easily increased in a phototransistor in which the bias between emitter-base, is electrically controlled. However, as it is easily considered from the example of the microwave transistor of FIG. 3, most parts of the light receiving surface are covered by the emitter electrodes, so that a light receiving coefficient is greatly decreased even though the response speed is increased. On the other hand, in a phototransistor in which the bias between emitter-base is optically controlled, it was necessary to apply high intensity light for providing a sufficient bias voltage to the conventional phototransistor, whereby the time-constant by the effect of factor 2 has been long and the response speed has been slow.

As stated above, in order to provide high speed response of the phototransistor, the light receiving coefficient was considered too low, so that it was not possible to obtain a high response speed phototransistor and to use the phototransistor in a practical high frequency application.

SUMMARY OF THE INVENTION

Accordingly, one object of the present invention is to provide a new and improved unique phototransistor and method of making the same which overcomes the above difficulties. It is another object of this invention to provide a new and improved unique phototransistor and method of making for generating enough photovoltage from an emitter-base bias by relatively low intensity light in the phototransistor in order to optically bias an emitter-base junction having no base electrode.

A still further object of this invention is to provide a new and improved unique phototransistor and method of making wherein the area of the emitter electrode is decreased so as to minimize the decrease of a light receiving factor.

One other object of the present invention is to provide a new and improved unique phototransistor and method of making which has small bias fluctuation and small output fluctuation with a change of temperature as well as stability and reliability.

Briefly, in accordance with this invention, the foregoing and other objects are in one aspect attained, by the provision of a phototransistor formed with a plurality of base layers and emitter layers having a small area on the common collector and progressively diffused therein, the thickness of the base layer being formed smaller than a depletion layer between the base-collector layers.

BRIEF DESCRIPTION OF THE DRAWINGS

A more complete appreciation of the invention will be readily obtained as the same becomes better understood by reference to the following detailed description when considered in connection with the accompanying drawings, wherein:

FIG. 8 (B) is a front view of the embodiment of FIG. 8(A);

FIG. 9 (B) is a sectional view of the embodiment of FIG. 9(A).

DETAILED DESCRIPTION OF THE PREFERRED EMBODIMENTS

Figure 1:
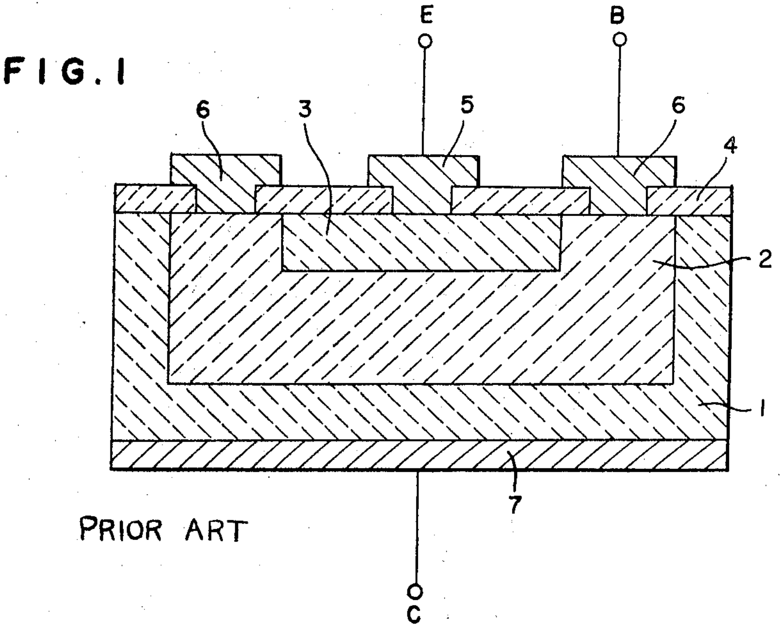
FIG. 1 is a sectional view of a conventional transistor.
Figure 2:
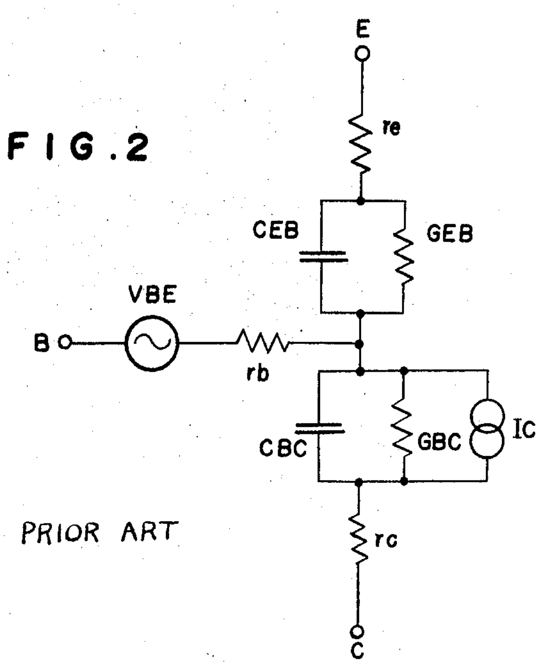
PRIOR ART FIG. 2
FIG. 2 is an equivalent circuit diagram of the transistor of FIG. 1.
Figure 3:
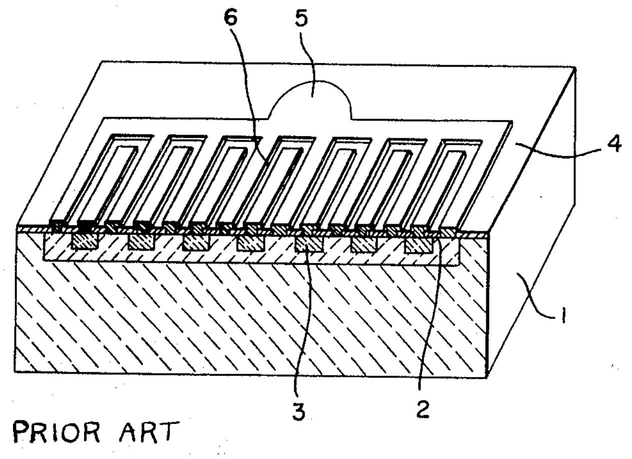
FIG. 3 is a sectional view of a conventional microwave transistor.
Figure 4:
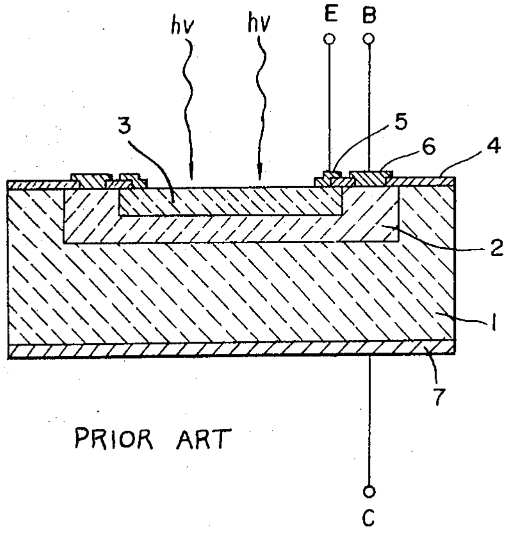
PRIOR ART FIG. 4
FIG. 4 is a sectional view of a conventional phototransistor.
Figure 5:
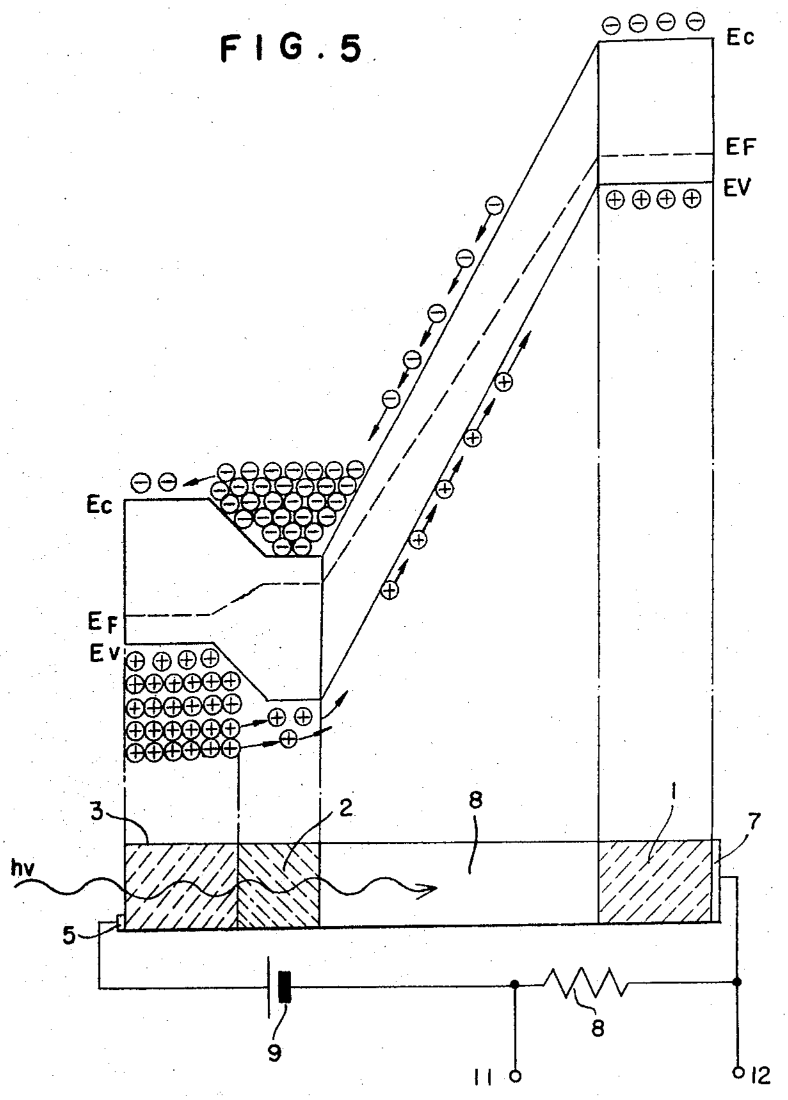
FIG. 5 is a schematic representation of energy bands corresponding to the structure of the phototransistor of FIG. 4.

Referring now to the drawings, wherein like reference numerals designate identical or corresponding parts throughout the several views, and more particularly to FIG. 5, the improvement of the embodiments of this invention will be illustrated by referring to the principle of operation of the conventional phototransistor. Fig. 5 is a schematic view of energy bands of a conventional phototransistor which is shown in relation to the vertical direction of a junction surface, the phototransistor including a P-type collector 1, and N-type base 2, a P-type emitter 3, electrodes 5 and 7, a depletion layer 8, a power source 9, a load resistor 10 and output terminals 11 and 12. Light $h\nu$ is applied from the emitter side as shown by the waved arrow line.

When the diffusion regions 2 and 3 are respectively thin and the depletion region 8 is thick so as to mostly absorb the light in the depletion layer 8, device efficiency is high. Accordingly, it is usual to provide a thick depletion layer 8 by forming a layer having a low concentration of impurity between the N-type base and the P-type collector.

In that structure, when the pairs of the electrons (⊖) and positive holes (⊕) are produced in the depletion layer by the application of light, the holes are drift-injected to the collector 1 and the electrons are drift-injected to the base 2.

When the electrons are injected in the base 2, the base potential is decreased by the electron charge, and the emitter-base is forwardly biased by the photovoltage until the electron injection rate is at equilibrium with the rate of electron injection from the base 2 to the emitter 3. The positive holes are injected from the emitter 2 to the base 3 by the forward bias, so as to pass to the collector 1 by the diffusion and drift. The rate of the positive holes injected from the emitter to the base is related to injection ratio times the rate of the electrons injected from base 2 to the emitter 3. The rate of electron injection determines the photocurrent of the photodiode consisting of the regions 2 – 8 – 1. Accordingly, a phototransistor is more advantageous than a photodiode by an amount of (1 + injection ratio).

Figure 6:
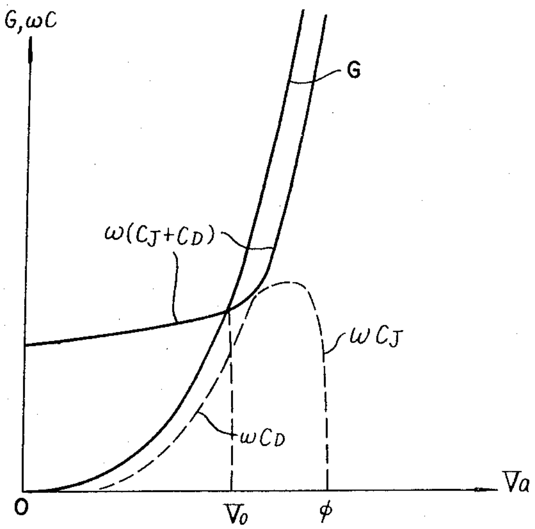
FIG. 6 is a graph showing characteristic curves of forward bias voltage for values of p-n junction conductance and susceptance.

The admittance of the p-n junction in the forward bias condition is controlled by a diffusion conductance of the injected carriers, a diffusion capacitance and a space charge capacitance of the accumulated carriers (this is referred to as the space charge capacity as it is not suitable to refer to depletion in the forward bias condition, even though it is similar to a depletion layer capacity). In FIG. 6, the above relations at a constant frequency are shown, and the abscissa shows the forward bias voltages of the p-n junction, while the ordinate shows the diffusion conductances G and the susceptances $\omega C$ by the capacitance, wherein $\omega\ C_D$ designates the susceptance by the diffusion capacitance and $\omega G$ designates the susceptance by the space charge capacitance. When the frequency increases, the curve of G relatively decreases.

In the range of low bias voltage, the frequency characteristics of the admittance of the p-n junction is determined by the diffusion conductance and the susceptance by the space charge capacitance. The diffusion conductance increases exponentially with an increase in the bias voltage, while the susceptance increases at a relatively low rate, and accordingly, the response speed increases depending upon the increase of the bias voltage.

When the bias voltage reaches a higher value than the diffusion potential of the P-n junction, the frequency characteristics of the P-n junction admittance is determined depending upon the diffusion conductance and the susceptance by the diffusion capacitance.

In the voltage range of operation, the relation between the susceptance and the conductance is not dependent upon the voltage, but rather is dependent upon the construction of the P-n junction (concentration of impurity and thickness etc.), and the device has a relatively high cutoff frequency. Accordingly, in order to increase the cutoff frequency of the phototransistor depending upon factor 2 discussed earlier defining the response speed, it is necessary to increase the forward bias voltage of the emitter-base junction.

Incidentally, heretofore, the phototransistor has been considered in only one dimension. That is, the phototransistor has been considered in only the vertical direction, since the emitter area is large compared to the depth of the operation region (thickness of the high electric field region plus diffusion length).

Figure 7:
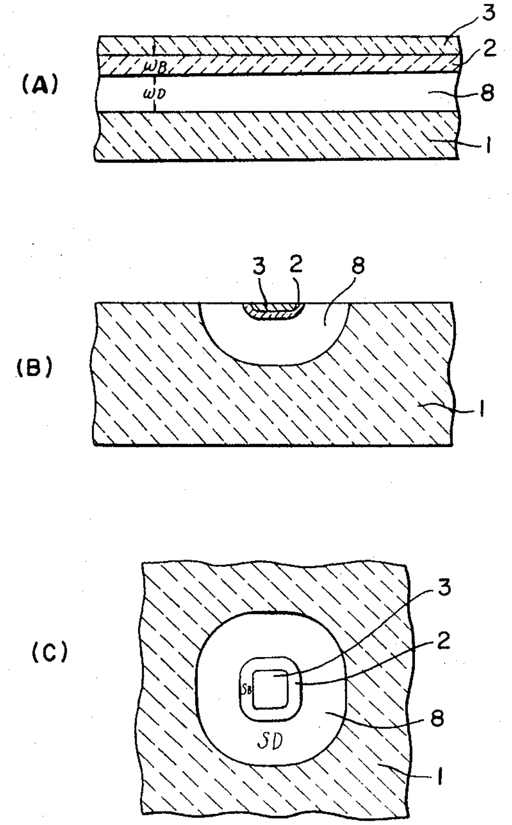
FIG. 7 is a schematic view of the phototransistor of the present invention illustrating the principle of the difference between the phototransistor of this invention and the conventional phototransistor.

In FIG. 7 (A), a one-dimentional structure of the phototransistor is shown, including a high electric field region 8 formed between the base 2 and collector 1. The effect of changing the base potential by applying light is mainly caused by the accumulation of the carriers produced in the high electric field region (strictly speaking, a plurality of the particles resulting carriers in the base region, such as electrons in a P-n-P type transistor or positive holes in an n-P-n type transistor) within the base region 2.

In the case of one-dimension consideration (FIG. 7(A)), the rate of accumulation of the carriers in the base region is increased depending upon decrease of a ratio of thickness $W_B$ of the base region 2 to a thickness $W_D$ of the high electric field region 8, whereby the accumulated concentration is increased, and the change of the base potential is increased.

The limitations of the one-dimensional structure are at about 0.1 micron of thickness of the base region and about 50 microns of thickness of the high electric field region 8 at the present time, because of processing limitations.

FIG. 7 (B) is a sectional view of the phototransistor for illustrating the basic phenomenon of the structure of this invention; and FIG. 7 (C) is a top view thereof. The present invention is quite effective when the base area is decreased so as to be less than the depth of the operational region in length, width or both as discussed ahead with reference to FIGS. 7 and 8.

Figure 8:
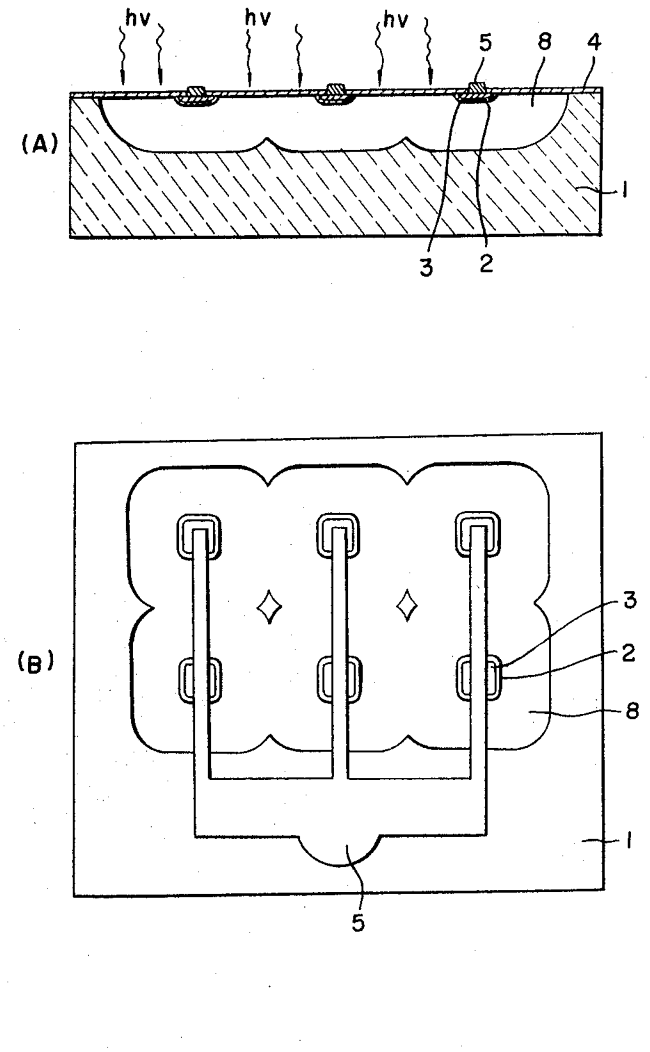
FIG. 8 (A) is a sectional view of one preferred embodiment of the photo transistor according to this invention.

In a three-dimensional structure according to this invention (shown in FIG. 8 (A) and (B)), the rate of accumulation of the carriers in the base region 2 is increased depending upon the decrease of a ratio of a volume of the base region 2 to a volume of the high electric field region 8 ($V_B/V_D$), whereby the accumulation concentration is increased. Accordingly, the accumulation speed of carriers in the base region 2, and the accumulation concentration are respectively increased at the rate of $S_D/S_B$, wherein $S_D$ designates an area of the high electric field region 8 and $S_B$ designates an area of the base region 2 in FIG. 7.

As a practical example, when the area $S_D$ of the high electric field region 8 is 50 microns × 50 microns, and the ares $S_B$ of the base region 2 is 5 microns × 5 microns, an increase in the accumulation speed and concentration of 100 times. The admittance between the emitter and base is changed from a susceptance type to a conductance type depending upon the accumulation of carriers in the base region 2. Accordingly, when the light intensity for the bias between the emitter and base is constant, it is easily understood that the phototransistor of this invention has a faster response speed than the conventional one-dimension structure type phototransistor since the cutoff frequency caused by the frequency characteristics of the admittance of the emitter-base junction is increased.

It is also clear that the structure of phototransistor of this invention providing higher accumulation concentration of carriers when the input light signal is constant, provides higher gain than the conventional one-dimension phototransistor structure. Incidentally, in this invention, it is unnecessary to worry about decrease in area of the transistor.

A plurality of units of the preferred embodiments shown in FIGS. 8A and 8B are arranged on a common collector 1, and emitters 3 are connected to an emitter electrode 5, the light receiving area being of a desirable size, and the parts, except the emitter, being insulated by an insulator membrane.

Figure 9:
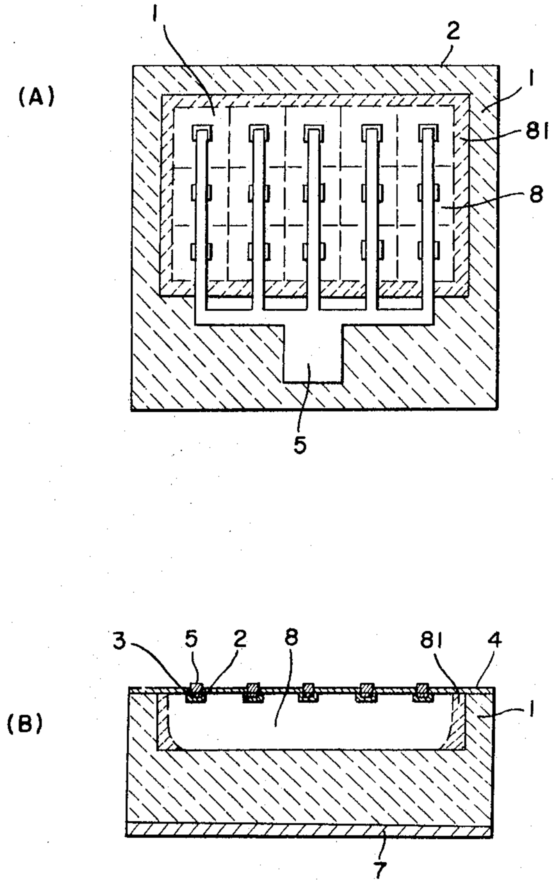
FIG. 9 (A) is a front view of another preferred embodiment of the phototransistor according to this invention.

FIG. 9 shows another embodiment of the phototransistor of this invention, wherein FIG. 9 (A) is a top view and FIG. 9 (B) is a sectional view. The difference between the embodiments shown in FIGS. 8 and 9, is that in FIG. 9, the portion 81 has no depletion region of the same conductivity type as the depletion layer 8 (high electric field region). the maximum unit sizes are determined so as to correspond the cutoff frequency, which depends upon the capacitance between the base and collector and a collector load resistance, to the required cutoff frequency. That is, the maximum units are determined from the relation of the corresponding time-constant dependant upon the capacitance between the base and collector and the collector load resistance, to the required response speed.

In the present invention, the base area per light receiving area is small, the time-constant is remarkably shortened compared to the conventional one-dimension phototransistor structure, and effects a high speed response. In the structure of the phototransistor having a plurality of units, it is desirable that adjacent units be connected through the high electric field region 8. However, when the thickness of the high electric field region 8 is approximately equal to the diffusion length of minority carriers, the response speed is not substantially decreased even though not connected.

Noise in the photodetector increases in proportion to one-half the square of the light receiving area; however, an input signal is proportional to the light receiving area, so that the signal-to-noise ratio is increased in proportion to 1/2 the square of the light receiving area. Accordingly, the phototransistor of this invention is improved in signal-to-noise ratio by one-half the square of the ratio of area (depletion layer area/base layer area) compared to the conventional one-dimension type phototransistor.

Certain examples of preparation and practical structure of the phototransistor of this invention will now be illustrated. In order to effectively perform the invention, it is necessary to increase the spread of the depletion layer between the base and collector and to form the emitter and base to have a quite small area, so as to be able to decrease the thickness of base, and to connect an ohmic contact to the emitter having a remarkably small area.

In order to increase the spread of the depletion layer, the following distribution of impurities can be provided:

| Emitter Region | Base Region | Collector Region |
|---|---|---|
| P+ | $n-\gamma$ | P |
| P+ | $n$ | $\rho$ – P |
| P+ | $n-\gamma$ | $\rho$ – P |
| $n$+ | P– $\rho$ | $n$ |
| $n$+ | P | $\gamma -n$ |
| $n$+ | P– $\rho$ | $\gamma -n$ |

In the table, the order of application to the surface is from right to left.

It is also possible to form the emitter and the base regions having a remarkably small area, by twice applying the conventional photoetching process. The following is simple and convenient:

A base diffusion is applied through a diffusion window formed by one photoetching process, in a nonoxidative atmosphere, and subsequently the surface is treated with an aqueous solution of HF ($HF/H_2O$ = 1/10) for a short time (several seconds – several 10 seconds) for etching so as to remove an oxidative membrane, and then an emitter diffusion is applied through the same window.

In that case, impurity concentrations and diffusion depths of the emitter and the base, can be controlled by the diffusion conditions (doping source and rate, temperature and time of atmospheric gas). When an emitter diffusion process is carried out in a nonoxidative atmosphere, the ohmic contact can be connected to the emitter by a slight etching treatment so that it is unnecessary to provide contact holes for the emitter.

In accordance with the above process, it is possible to decrease the base area to about 1 micron × 1 micron by our present technical skills, so that a high speed, high sensitive phototransistor can be manufactured. When the remarkably small emitter-base regions are formed, both the emitter and base regions are covered by an emitter wire. However, the high electric field region and diffusion length around the region operate as a light receiving region. Accordingly, no difficulty is encountered with regard to an inadequate light receiving region.

In accordance with this invention, it is desirable to enlarge a ratio of areas (depletion layer area/base layer area). However, as the spread of the depletion layer is increased, certain disadvantageous characteristics occur. For example, the frequency depends upon the time for transmitting carriers through the depletion layer is decreased, or as another example, a junction breakdown is easily created between the base and collector by causing a field centralizing effect around the base region in proportional to the ratio of areas. The optimum values of thickness of the depletion layer and the ratio of areas are dependent upon the conditions applying the phototransistor; thus the values are approximately 15 microns of the thickness of the depletion layer, 100 of the ratio of areas and 25 square microns of base layer area.

Incidentally, as a high specific resistance semiconductor is employed for spreading the depletion layer, a needless channel is sometimes formed by the effect of an atmosphere environment or a manufacture process. Accordingly, it is preferable to form a low resistance region around the operation region of the phototransistor (only surface) at a position slightly departed from the high electric field regions as a channel stopper.

Incidentally, the application of the phototransistor of this invention is not limited by a structure such as a planar type or a mesa type, or by methods of manufacture such as a diffusion method, an alloying process or an epitaxial growth process.

As stated above, in accordance with the invention, a plurality of base layers and emitter layers having remarkably small areas, respectively, are diffused progressively on a common collector, and a plurality of emitter layers are commonly connected with one emitter electrode whereby the thickness of the base layer is smaller than the spread of the depletion layer between the base and collector. Accordingly, high load resistance can be applied and bias fluctuation and output fluctuation caused by temperature, can be decreased and a stable and highly reliable product can be manufactured. Furthermore, it is possible to provide a high speed response phototransistor which contributes to the high speed of a photocommunication system, in comparison with the conventional avalanche photodiode which is unstable in characteristics since it is an element which utilizes a breakdown phenomenon and has low reliability.

Obviously, numerous modifications and variations of the present invention are possible in light of the above teachings. It is therefore understood that within the scope of the appended claims, the invention may be practiced otherwise than as specifically described herein.

What is claimed as new and desired to be secured by letters patent of the United States is:

1. A high speed response phototransistor which comprises:

a plurality of pairs of base layers and emitter layers which are progressively diffused on a common collector, forming a plurality of base-emitter layers, an emitter electrode which commonly connects said plurality of emitter layers, and a depletion region which has a large width compared to said base layers and emitter layers between said base layers and said collector 1 thereby forming base-emitter layers having an area smaller than a planar spread area of the depletion region.

2. A high speed response phototransistor according to claim 1 having a thin base layer.

3. A high speed response phototransistor according to claim 1 wherein said depletion region is formed between said base layers and adjacent said emitter layers.

4. A high speed response phototransistor according to claim 1 wherein alternatively a length or width of said base layer is smaller than a depth of an operation region defined by a thickness of depletion region and a diffusion length.

5. A high speed response phototransistor according to claim 1 wherein a length and width of said base layer is smaller than a depth of an operation region defined by a thickness of a high electric field region and a diffusion length.

6. A high speed response phototransistor according to claim 1 wherein the length of a nondepletion base region in a bias condition is smaller than the spread of said depletion region between said base layers and said collector in a bias condition.

7. A method of manufacturing a high speed response phototransistor of claim 1 comprising the steps of:

diffusing a base layer from a diffusion window formed by one photoetching in a nonoxidative atmosphere;

treating said diffused base layer by etching for a short time; and diffusing an emitter layer from said diffusion window.

* * * * *